United States Patent Office 3,426,007
Patented Feb. 4, 1969

3,426,007
POLYMERIZATION CATALYST SYSTEM
Joseph P. Kennedy, Cranford, N.J., assignor to Esso Research and Engineering Company, a corporation of Delaware
No Drawing. Filed Oct. 21, 1965, Ser. No. 500,266
U.S. Cl. 260—85.3          28 Claims
Int. Cl. C08f 1/28, 15/04, 3/02

ABSTRACT OF THE DISCLOSURE

A catalyst and a process for polymerizing monomers wherein the catalyst system comprises a catalyst of the type $Al(R)_2X$, wherein R is a branched or straight chain $C_1$–$C_{12}$ alkyl and X is selected from the group consisting of hydrogen and halogen and a promoter comprising a solid (frozen) inorganic acid selected from the group consisting of inorganic oxygenated acids of sulfur, nitrogen, phosphorus, and boron.

---

The present invention relates to the use of a novel catalyst system for enhancing the polymerization rate of olefinic materials. In particular, this invention relates to the enhanced polymerization of unsaturated hydrocarbon monomeric materials to high molecular weight homopolymers and copolymers with a catalyst system comprising (1) a catalyst of the type $Al(R)_2X$, wherein R is a branched or straight chain $C_1$–$C_{12}$ alkyl and X is selected from the group consisting of hydrogen and halogen, and (2) a promoter consisting of a solid (frozen) inorganic acid selected from the group consisting of the inorganic oxygenated acids of sulfur, nitrogen, phosphorus and boron. More particularly, this invention relates to the production of high molecular weight homopolymers and copolymers of isomonoolefins with the above-described novel catalyst system. Still more particularly, this invention relates to the production of high molecular weight polyisobutene and butyl-type rubbers, i.e., copolymers of an isoolefin, such as isobutene, and a multiolefin, such as isoprene.

It has been proposed to polymerize and copolymerize hydrocarbons of the olefin series by means of a catalyst represented by the formula $R_nAlX_m$, wherein R is a monovalent alkyl hydrocarbon radical, X is halogen and $m$ and $n$ are integers from 1 to 2 inclusive and $m+n=3$. See, for example, U.S. Patents 2,220,930 and 2,387,517. Co-assigned U.S. application Ser. No. 266,267, filed Mar. 20, 1963, describes a liquid catalyst systems for the production of butyl-type rubbers. The catalyst system described therein comprises an alkyl aluminum halide with a ratio of alkyl groups to halogen atoms corresponding approximately to the formula $AlRX_2$, wherein R is an alkyl group and X represents a halogen atom. It was pointed out in that application that where the ratio of alkyl groups to halogen atoms is reversed, i.e., the formula is $AlR_2X$, no polymerization will occur.

It has further been proposed that dialkyl aluminum halides and hydrides can be utilized as a catalyst for the polymerization of olefins in combination with promoter compounds such as anhydrous halogen halides or tertiary-alkyl halides. See, for example, co-assigned U.S. patent applications, Ser. No. 364,295 and Ser. No. 364,110. It has also been reported that dialkyl aluminum halides can be utilized to polymerize isoolefins when promoted with a small quantity of liquid water. See, for example, Italian Patent 631,930.

Thus, it can be seen that a variety of catalytic systems have been proposed for the low temperature polymerization and copolymerization of hydrocarbons of the olefin series. There is, however, a continuing search for new catalyst systems which will improve polymerization rate, reduce process difficulties, reduce cost, and increase the molecular weight of the resulting polymers.

It has now been discovered that the low temperature polymerization of hydrocarbons of the olefin series can be effected by the utilization of a catalyst selected from the group consisting of dialkyl aluminum halides and dialkyl aluminum hydrides, and a promoter comprising a solid (frozen) inorganic acid selected from the group consisting of the inorganic oxygenated acids of sulfur, nitrogen, phosphorus, and boron.

The exact nature and objects of this invention will be more clearly perceived and more clearly understood by referring to the following description and claims.

The olefin polymerization feeds useful in connection with the present catalyst system are, in general, unsaturated hydrocarbons containing between 3 and 10 carbon atoms. Specifically, typical olefin polymerization feeds include: $C_3$–$C_{10}$ alpha-olefins, $C_4$–$C_8$ isomonoolefins, $C_4$–$C_{10}$ multiolefins, e.g., conjugated and non-congugated diolefins, $C_5$–$C_7$ cycloalkyl dienes, and $C_8$–$C_{10}$ vinyl aromatic compounds.

Examples of suitable olefins include: propylene, butene-1, pentene-1, heptene-1, and decene-1, 3-methyl-1-butene, 4-methyl-1-pentene, 4-methyl-1-hexene; isobutene, 2-methyl-1-butene, 2-ethyl-1-pentene, and 2-methyl-1-hexene; butadiene, isoprene, piperylene, hexadiene, octadiene and 2,5-dimethyl-2,5-hexadiene, cyclopentadiene, methylcyclopentadiene, cyclohexadiene, and methylcyclohexadiene; styrene and alpha-methylstyrene. Isobutene and copolymers thereof are preferred.

Copolymers of a major amount of an isoolefin, such as isobutene, together with a minor amount of a multiolefin, such as isoprene, are known as butyl-type rubbers. These materials have long been known in the art. See, for example, Chapter 24, Synthetic Rubber by G. S. Whitby (John Wiley and Sons, Inc., 1954) and U.S. Patent 2,356,128 to Thomas et al. among many others. Butyl-type rubbers are prepared by reacting a major proportion, e.g., about 70–99.5 parts by weight, of an isoolefin with a minor proportion, e.g., about 30–0.5 parts by weight, preferably 15–0.5 parts by weight, of a multiolefin, preferably a diolefin. The isoolefin, in general, is a $C_4$–$C_8$ isomonoolefin such as isobutene, 2-methyl-1-butene, 3-methyl-1-butene, 2-methyl-2-butene, and 4-methyl-1-pentene. The multiolefin, in general, is a $C_4$–$C_{10}$ conjugated diolefin, e.g., isoprene, butadiene, 2,3-dimethyl-1,3-butadiene, myrcene, 6,6-dimethyl fulvene and piperylene. Preferred copolymers are obtained by reacting between about 95 and about 99.5 wt. percent by weight of isobutene with between about 0.5 and about 5% by weight of isoprene.

Cyclodiolefinic compounds, such as cyclopentadiene and methylcyclopentadiene, as well as compounds such as beta-pinene and divinyl benzene may be copolymerized with the isoolefin either in addition to the diolefin or in place of the diolefin. These additional diolefins may be incorporated in amounts of up to about 6% by weight, based on the isoolefin, preferably in amounts of between about 0.3 and about 2.0 wt. percent. Thus, terpolymers and tetrapolymers can be prepared depending upon the number of monomers utilized.

The catalyst system, which is an essential feature of the present novel process, comprises (1) a catalyst of the type $Al(R)_2X$, wherein R is a branched or straight chain $C_1$–$C_{12}$ alkyl and X is selected from the group consisting of hydrogen and halogen, and (2) a promoter comprising a solid (frozen) inorganic acid selected from the group consisting of the inorganic oygenated acids of sulfur, nitrogen, phosphorus and boron. The combination of said catalyst and promoter will be referred to as a "catalytic mixture." For purposes of brevity, the compound represented by the formula Al(R)$_2$X will be referred to as the "catalyst" though it should be realized that these compounds will, by themselves, not act as a catalyst in the olefin polymerizations of the present process.

The catalyst component utilized in the present novel catalyst system are those compounds represented by the empirical formula Al(R)$_2$X, wherein R is a branched or straight chain alkyl group having from 1 to 12 carbon atoms and X is selected from the group consisting of hydrogen and halogen. The alkyl group, R, can be the same or different. The halogen can be any of the members of that series, i.e., chlorine, bromine, fluorine and iodine. Suitable catalysts coming within the scope of the above empirical formula include: diethyl aluminum chloride, dipropyl aluminum chloride, diisopropyl aluminum chloride, dibutyl aluminum chloride, diisobutyl aluminum chloride, dipentyl aluminum chloride, dihexyl aluminum chloride, didecyl aluminum chloride, diethyl aluminum bromide, diisobutyl aluminum bromide, dioctyl aluminum bromide, didodecyl aluminum bromide, diethyl aluminum iodide, dibutyl aluminum iodide, diheptyl aluminum iodide, dinonyl aluminum iodide, ethyl propyl aluminum chloride, propyl butyl aluminum chloride, ethyl propyl aluminum bromide, diethyl aluminum hydride, dibutyl aluminum hydride, and dihexyl aluminum hydride. The preferred catalyst is diethyl aluminum chloride, which will be used here for illustrative purposes.

Diethyl aluminum chloride, which is commercially available, is a clear colorless liquid with a melting point of $-74°$ C., and a boiling point of $208°$ C. The substance is highly reactive with oxygen and will burst into flames in air and react violently with water. It is miscible with saturated aliphatic and alicyclic hydrocarbons, chlorinated hydrocarbons, carbon disulfide, etc. Diethyl aluminum chloride may be prepared from aluminum triethyl and aluminum chloride according to the following formula:

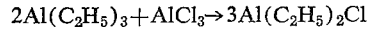

$$2Al(C_2H_5)_3 + AlCl_3 \rightarrow 3Al(C_2H_5)_2Cl$$

The amount of catalyst employed in the present process can vary over a wide range; but, in general, will range from between about 0.001 and about 5.0 wt. percent, based on the amount of monomer employed, and preferably, will range from between about 0.01 and about 1.0 wt. percent, based on monomer.

The promoters which form the second component of the instant two-component catalyst system are solid (frozen) inorganic acids selected from the group consisting of the oxygenated inorganic acids of sulfur, nitrogen, phosphorus and boron, i.e., those acids containing one or more atoms of oxygen in the molecule. Since the present process is carried out at low temperatures, the inorganic acid promoters are not utilized in a liquid form but in a solid or frozen form. The use of a solid promoter in lieu of a liquid promoter provides the advantage of retarding chain terminating reactions during the polymerization process with the consequent result of higher polymer molecular weights.

While not intending to be bound by any particular theory, it is believed that the promoter in a catalyst-promoter system provides the counter ion which becomes involved in chain transfer and chain termination reactions, which tend to diminish product molecular weight. Since the promoter in the present process is in the solid phase and therefore is removed from the liquid phase in which polymerization propagation proceeds, the opportunity for the promoter to exert its adverse influence is diminished. Thus, high molecular weight products are formed.

Examples of suitable inorganic oxygenated acids include: sulfuric acid, sulfurous acid, thiosulfuric acid ($H_2S_2O_3$), hyposulfuric acid ($H_2SO_2$), metasulfuric acid ($H_2S_2O_5$), peroxy sulfuric acid ($H_2SO_5$), pyrosulfuric acid ($H_2S_2O_7$), and persulfuric acid ($H_2S_2O_8$); nitric acid, nitrous acid; phosphoric acid, metaphosphoric acid (HPO$_3$); pyrophosphorous acid ($H_4P_2O_5$), pyrophosphoric acid ($H_4P_2O_7$), peroxy diphosphoric acid ($H_4P_2O_8$), peroxy phosphoric acid ($H_3PO_5$); hypophosphoric acid ($H_4P_2O_6$), phosphorus acid, orthophosphorous acid [$H_2(HPO_3)$], metaphosphorous acid (HPO$_2$) and hypophosphorous acid [$H(H_2PO_2)$]; and boric acid, anhydrous boric acid ($B_2O_3$) and tetraboric acid ($H_2B_4O_7$).

The solid or frozen oxygenated inorganic acid promoters used in the instant process can be prepared by any convenient method; and, are generally prepared by simply subjecting the corresponding liquid inorganic acid to very low temperatures. The liquid oxygenated inorganic acid can have an acid concentration which can vary from as little as about 1 wt. percent to about 99.+wt. percent. Anhydrous acids can also be employed and are preferred when they are available. In general, better results, with regard to polymerization rate and product molecular weight, are achieved when the concentration of the liquid inorganic acid is at least 20 wt. percent. Preferably, the concentration should be at least between about 20 wt. percent and about 40 wt. percent for the reason that a strong product molecular weight increase starts to manifest itself at about these concentrations. The highest molecular weights obtained are with anhydrous acids.

The amount of promoter needed to initiate polymerization varies with the exposed surface area and activity of the promoter employed. The greater the dispersion of the promoter, the less promoter required. In general, the ratio of promoter to catalyst will vary between about 1 mole and about 99 moles of promoter per mole of catalyst. In addition, it is preferred to highly disperse the promoter in the polymerization zone. This can be accomplished by the use of fine particles, mixing or any other conventional method.

The polymerization reaction is generally carried out in the presence of a suitable solvent or diluent which can be selected from any of the conventional solvents utilized for the low temperature polymerization of olefins such as isobutene. Specific examples of suitable solvents include the lower alkyl halides such as methyl chloride, methylene chloride, ethyl chloride, methyl bromide, vinyl chloride as well as carbon disulfide and chlorobenzene. Hydrocarbon solvents that are liquid at the polymerization temperature can also be used. These include $C_2$–$C_{16}$ saturated aliphatic and alicyclic hydrocarbons such as pentane, isopentane, isooctane, methylcyclohexane, cyclohexane, etc. The preferred solvent is methyl chloride. The amount of solvent utilized can vary between about 0 and about 99 volume percent, but preferably, will vary between about 60 and about 80 volume percent.

The polymerization reaction can be carried out over a wide range of temperatures, e.g., between about $50°$ C. and about $-130°$ C., advantageously between about $10°$ C. and about $-100°$ C. and preferably between about $0°$ C. and about $-78°$ C. Polymerization pressures can be at atmospheric or above. Broadly, the pressure can vary between about 1 atmosphere and about 1500 atmospheres but, preferably, will vary between about 1 atmosphere and about 20 atmospheres. Polymerization times can be anywhere between about 1 second and about 48 hours but, preferably, will range between about 0.5 minute and about 8 hours.

In carrying out the polymerization reaction, it is conventional to admix the monomers and solvent to be employed followed by the addition of the catalyst and promoter; however, the exact sequence of mixing is not critical and will vary depending upon the nature of the process and the type of process equipment available.

The polymers produced accordingly to the present process will range from resinous to rubbery polymers, depending upon the starting monomer. Viscosity average molecular weights of the polymers will range between about 100,000 and about 1,500,000 and will preferably range between about 300,000 and about 1,000,000.

Molecular weights of the polymers prepared in the subsequent examples were obtained from viscosity measurements of 0.1% polymer solutions in diisobutylene at 20° C. The intrinsic viscosities were obtained from single measurements using the slope of the curve, $\ln \eta_{inh}/C$. (inherent viscosity/concentration). The viscosity average molecular weights were calculated from the equation:

$$\ln M_v = 12.48 + 1.565 \ln[\eta]$$

The polymers produced according to the present process can be used in any of the applications known in the art for polymers of the type produced by the present novel process. Useful applications include: automotive inner tubes, insulating cables, pipes, gaskets, etc.

The various aspects and modifications of the present invention will be made more clearly apparent by reference to the following description and accompanying examples.

EXAMPLE 1

A small reaction vessel was charged with 10 ml. (0.14 mole) of isobutene and 10 ml. of methyl chloride. The quiescent mixture was held at −78° C. and about 0.13 ml. (1 millimole) of diethyl aluminum chloride was added thereto. After about 1 hour of stirring, no polymerization occurred. The reaction mixture was then heated to about −25° C., but, no polymerization occurred.

EXAMPLE 2 (RUNS 1–6)

Run 1

Sulfuric acid (95–98 wt. percent) was cooled to −78° C. The acid froze to a powdery material. A small reaction vessel was charged with 10 ml. of isobutene (0.14 mole), 10 ml. of methyl chloride, and 0.13 ml. of diethyl aluminum chloride (1 millimole). The quiescent mixture was stirred at −78° C. for about 20 minutes and thereafter, about 0.01 gram of the powdery sulfuric acid was introduced into the reaction mixture. Soon after the acid was added, polymerization commenced. The solid acid was coated with rubbery polymer and polymerization became diffusion controlled. After about 10 minutes, the polymerization reaction was terminated with cold methanol. A white rubbery polymer was separated and dried in vacuum at 50° C. 2.82 grams (40.3% conversion) of polyisobutene which had a viscosity average molecular weight of about 178,660 was obtained.

Run 2

Run No. 1 was repeated except that the isobutene monomer was added to the powdery sulfuric acid at −78° C. Polymerization commenced after about 15 seconds and proceeded slowly until terminated with cold methanol. A rubbery polymer of about 400,200 viscosity average molecular weight was obtained.

Run 3

Run No. 1 was repeated except that a large amount of powdery sulfuric acid (about 0.05–0.07 gram) was added to the monomer-diluent admixture. Polymerization became explosive upon addition of the powdery sulfuric acid, i.e., the polymerization temperature rose immediately to −23° C., which is the boiling point of the solvent, and the polymer formed was thrown out of the reaction vessel. Conversion was apparently 100%. The molecular weight of the resulting polymer was high but unmeasurable due to the fact that it was thrown out of the reaction vessel.

Run 4

In a manner similar to Run No. 1, isobutene and methyl chloride were charged to a reaction vessel and stirred at −78° C. About 0.2 gram of powdery sulfuric acid was added to the reaction mixture. No visible polymerization occurred. The temperature of the reaction vessel was raised to −70° C. and held there for 45 minutes, however, no polymerization occurred. No polymerization occurred even after the system was warmed to −25° C.

Run 5

In a manner similar to Run No. 1, a polymerization was carried out using fuming sulfuric acid as the promoter. Immediately after promoter addition, polymer formation was noticeable and appeared to be concluded about 90 seconds after commencement of polymerization. The solid promoter was coated with a heavy layer of polymer. Polymerization was terminated with cold methanol after about 8½ minutes at −78° C. 1.34 grams (19.2% conversion) of polyisobutene having an intrinsic viscosity of 3.480 and a viscosity average molecular weight of about 1,857,000 was obtained.

Run 6

In a manner analogous to Run No. 5, ice was substituted for the fuming sulfuric acid as the promoter. Polymerization commenced about 2 minutes after addition of the ice and then continued at a very slow rate until terminated at 9 minutes from the start of the run. 0.09 gram (1.3% conversion) of polyisobutene was obtained having a viscosity average molecular weight of about 500,000.

Thus, not only was the percent conversion using ice as the promoter much smaller than the percent conversion obtained with sulfuric acid; but the rate of polymerization with ice was substantially lower than the polymerization rate with sulfuric acid.

EXAMPLE 3 (RUNS 1–3)

Run 1

In a manner similar to Run No. 1 of Example 2, frozen nitric acid prepared from 90 wt. percent nitric acid was added to an isobutene-methyl chloride reaction admixture. Polymerization commenced immediately upon addition of the frozen nitric acid and was terminated with cold methanol. A solid, high molecular weight polyisobutene of about 691,400 viscosity average molecular weight was obtained.

Run 2

In a manner similar to Run No. 2 of Example 2, isobutene monomer was added to frozen nitric acid (90 wt. percent) held at −78° C. Polymerization commenced immediately and proceeded slowly until terminated with cold methanol. Rubbery polyisobutene of about 553,000 viscosity average molecular weight was obtained.

Run 3

A control run analogous to Run No. 4 of Example 2 was performed utilizing frozen nitric acid alone. This run did not result in the production of any polymer.

EXAMPLE 4—RUNS 1–2

Run 1

In a manner similar to Run No. 1 of Example 2, about two drops of frozen phosphoric acid, prepared from 85 wt. percent phosphoric acid, was used as the promoter and a rubbery polyisobutene of about 602,800 viscosity average molecular weight was obtained.

Run 2

A control experiment, similar to Run No. 4 of Example 2, which used only frozen 85 wt. percent phosphoric acid as the catalyst did not result in the production of any polymer.

EXAMPLE 5

Pure anhydrous boric acid ($B_2O_3$) was used as a promoter in a polymerization reaction analogous to Run 1 of Example 2. 0.1 g. of $B_2O_3$ was added to an admixture of 10 ml. of isobutene, 1 ml. of methyl chloride, and 9 ml. of pentane. Polyisobutene having an intrinsic viscosity of 1.994 and a viscosity average molecular weight of 776,000 was obtained.

The data contained in Examples 1 through 5 demonstrate that surprisingly high molecular weight polymers can be readily prepared using a dual catalyst system comprising (1) a dialkyl aluminum halide and (2) a solid (frozen) inorganic oxygenated acid of nitrogen, sulfur, phosphorus or boron.

While there are above-described a number of specific embodiments of the present invention, it is obviously possible to produce other embodiments of various equivalent modifications and variations thereof without departing from the spirit of the invention.

Having now set forth the general nature and specific embodiments of the present invention, the true scope is now particularly pointed out in the appended claims.

What is claimed is:

1. A process which comprises polymerizing $C_3$–$C_{10}$ unsaturated hydrocarbons with a catalytic mixture consisting essentially of:
   (a) a catalyst having the empirical formula, $Al(R)_2X$, wherein R is selected from the group consisting of branched and straight chain $C_1$–$C_{12}$ alkyl, X is selected from the group consisting of hydrogen and halogen, and
   (b) a promoter consisting of a solid (frozen) inorganic acid selected from the group consisting of the inorganic oxygenated acids of sulfur, nitrogen, phosphorous and boron, at a temperature [of between about 50° C. and about −130° C.] below the freezing point of said acid.

2. A process according to claim 1 wherein said $C_3$–$C_{10}$ unsaturated hydrocarbons are selected from the group consisting of $C_3$–$C_{10}$ alpha-olefins, $C_4$–$C_8$ isomonoolefins, $C_4$–$C_{10}$ multiolefins, $C_5$–$C_7$ cycloalkyldienes and $C_8$–$C_{10}$ vinyl aromatic compounds.

3. A process according to claim 1 wherein said unsaturated hydrocarbon polymerized is a mixture of between about 70 and about 99.5 wt. percent of a $C_4$–$C_8$ isomonoolefin and between about 30 and about 0.5 wt. percent of a $C_4$–$C_{10}$ diolefin.

4. A process according to claim 3 wherein said isomonoolefin is isobutene and said diolefin is isoprene.

5. A process according to claim 1 wherein said catalyst is diethyl aluminum chloride.

6. A process according to claim 1 wherein said promoter is selected from the group consisting of boric acid and tetraboric acid.

7. A process according to claim 1 wherein the temperature of said polymerization is between about 0° C. and about −78° C.

8. A process according to claim 1 wherein said catalyst is employed in an amount of between about 0.001 and about 5.0 wt. percent based on the amount of unsaturated hydrocarbon monomer.

9. A process according to claim 1 wherein said promoter is employed in an amount of between about 1 and about 99 moles of promoter per mole of catalyst.

10. A process according to claim 1 wherein the inorganic oxygenated acid has an acid concentration of at least 20 wt. percent.

11. A process which comprises polymerizing isobutene with a catalytic mixture comprising (a) diethyl aluminum chloride and (b) a promoter consisting of a solid (frozen) inorganic acid selected from the group consisting of sulfuric acid, nitric acid, phosphoric acid and boric acid, at a temperature of between about 0° C. and about −78° C.

12. A catalytic mixture for the production of high molecular weight polymeric materials comprising:
   (a) a catalyst having the empirical formula, $Al(R)_2X$, wherein R is selected from the group consisting of branched and straight chain $C_1$–$C_{12}$ alkyl, and X is selected from the group consisting of hydrogen and halogen, and
   (b) a solid (frozen) inorganic acid selected from the group consisting of the inorganic oxygenated acids of sulfur, nitrogen, phosphorus and boron.

13. A catalytic mixture according to claim 12 wherein said catalyst is diethyl aluminum chloride.

14. A catalytic mixture according to claim 12 wherein said promoter is selected from the group consisting of sulfuric acid, nitric acid, phosphoric acid and boric acid.

15. A catalytic mixture according to claim 12 wherein said halogen of the catalyst, $Al(R)_2X$, is chlorine.

16. A process which comprises polymerizing isobutene with a catalytic mixture comprising (a) diethyl aluminum chloride and (b) fuming sulfuric acid at a temperature of about −78° C.

17. A process according to claim 1 wherein the temperature is about 50° C. to about −130° C.

18. A process which comprises polymerizing $C_4$–$C_{10}$ unsaturated hydrocarbon monomers wherein said monomers are selected from the group consisting of (1) isomonoolefins, (2) non-conjugated multiolefins having at least one isopropenyl group and no vinyl unsaturation, (3) a mixture of unsaturated hydrocarbon monomers comprising a major portion of at least one monomer selected from the group consisting of said isomonoolefins and said multiolefins, with a catalytic mixture consisting essentially of:
   (a) a catalyst having the empirical formula, $Al(R)_2X$, wherein R is selected from the group consisting of branched and straight chain $C_1$–$C_{12}$ alkyl, and X is selected from the group consisting of hydrogen and halogen, and
   (b) a solid (frozen) inorganic acid promoter selected from the group consisting of the inorganic oxygenated acids of sulfur, nitrogen, phosphorus and boron, at a temperature below the freezing point of said acid.

19. A process according to claim 18 wherein said monomer polymerized is a mixture of about 70 to about 99.5 wt. percent of a $C_4$–$C_8$ isomonoolefin and between about 30 and about 0.5 wt. percent of $C_4$–$C_{10}$ diolefin.

20. A process according to claim 19 wherein said isomonoolefin is isobutene and said diolefin is isoprene.

21. A process according to claim 18 wherein said catalyst is diethyl aluminum chloride.

22. A process according to claim 18 wherein said promoter is selected from the group consisting of sulfuric acid, sulfurous acid, nitric acid, nitrous acid, phosphoric acid, and phosphorous acid.

23. A process according to claim 18 wherein said promoter is selected from the group consisting of boric acid and tetraboric acid.

24. A process according to claim 18 wherein the temperature of said polymerization is between about 0° and about −78° C.

25. A process according to claim 18 wherein said catalyst is employed in an amount of between about 0.001 and about 5.0 wt. percent based on the amount of unsaturated hydrocarbon monomer.

26. A process according to claim 18 wherein said promoter is employed in an amount of about 1 to about 99 moles of promoter per mole of catalyst.

27. A process according to claim 18 wherein said inorganic oxygenated acid has an acid concentration of at least 20 wt. percent.

28. A process according to claim 18 wherein the temperature is about 50° C. to about −130° C.

References Cited

UNITED STATES PATENTS

| | | | |
|---|---|---|---|
| 3,161,628 | 12/1964 | Dost et al. | 260—94.9 |
| 3,271,381 | 9/1966 | Anderson et al. | 260—94.9 |

JOSEPH L. SCHOFER, *Primary Examiner.*

R. C. GAITHER, *Assistant Examiner.*

U.S. Cl. X.R.

252—428, 429; 260—93.1, 93.5, 94.8, 94.9